Patented June 28, 1938

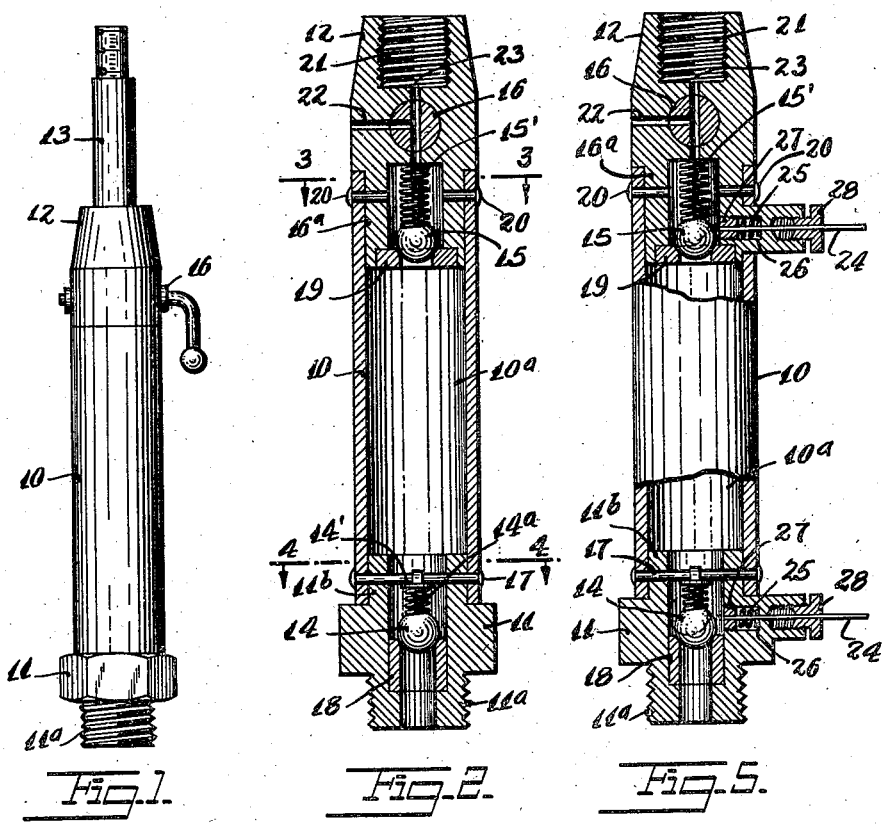
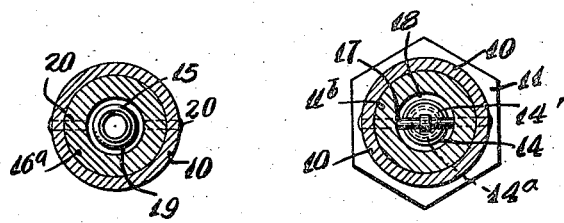

2,122,243

UNITED STATES PATENT OFFICE 2,122,243

PRESSURE GAUGE FOR INTERNAL COMBUSTION MOTORS

John Bonhard, West New York, N. J.

Application February 18, 1937, Serial No. 126,421

2 Claims. (Cl. 73—31)

This invention relates to new and useful improvements in a pressure gauge for internal combustion motors.

The invention has for an object the construction of a pressure gauge which is adapted to be substituted for each of the spark plugs of an automobile engine or other engine and to register the pressure built up in the cylinders during the running of the engine on some of its cylinders, or during such time when the engine is being turned over, either manually or mechanically.

The purpose of this test is to locate trouble in the engine, such as excessive leaking pistons and valves.

The invention has for an object the construction of a pressure gauge which is characterized by a tubular member forming a compartment, a pressure valve mounted in one end of the tubular member, and an arrangement for mounting the other end of the tubular member in place of a removed spark plug of the automobile or the other engine.

Still further the invention proposes a novel construction of valve associated with the tubular member so as to hold pressures built up therein. It is thus possible to register the highest pressure without requiring fast reading of the gauge due to rapid fluctuations of the ordinary pressures within a motor cylinder.

Still further the invention proposes an arrangement by which the valves may be temporarily inoperative when desired so that the fluctuating pressures may be examined.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a pressure gauge constructed according to this invention.

Fig. 2 is a vertical sectional view of the gauge shown in Fig. 1.

Fig. 3 is a horizontal sectional view taken on the line 3—3 of Fig. 2.

Fig. 4 is a horizontal sectional view taken on the line 4—4 of Fig. 2.

Fig. 5 is a fragmentary vertical sectional view similar to Fig. 2 but illustrating a modification of the invention.

The pressure gauge for motors, according to this invention, comprises a tubular member 10 forming a compartment 10ª. A tubular bushing 11 is attached on the lower end of the member 10 and has a threaded portion 11ª adapted to engage into the spark plug opening of one of the cylinders of the motor. A tubular bushing 12 is attached upon the upper end of the member 10 and is adapted to support a pressure gauge 13. A one way valve 14 is mounted within the bottom bushing 11. Another one way valve 15 is mounted within the top bushing 12. A three way cock 16 is associated with the top bushing for controlling the passage of air to the gauge.

The bushing 11 has a reduced end 11ᵇ over which the tubular member 10 seats. A pin 17 is engaged through the tubular member and bushing for attaching these parts together. This pin supports a washer 14′ which serves as a "stop" for one end of a coil spring 14ª. The other end of spring 14ª presses against the valve ball 14. A valve seat 18 is mounted within the bushing 11 and the valve 14 comprises merely a sphere adapted to seat upon one end of the seat member 18. The valve 14 is limited in the distance it may move off the seat by the spring 14ª. The valve 14 permits pressure to pass upwards into the compartment 10ª and prevents backwash of the pressure.

The bushing 12 is formed with a reduced portion 12ª over which the top end of the tubular member 10 engages. A valve seat 19 is supported upon the bushing 12 and the valve 15 is cooperative with this seat. Pins 20 engage through the tubular member 10 and the bushing 12 for connecting these parts together. A coil spring 15′ is provided to press the valve ball 15 against valve seat 19. The top end of the bushing 12 has a threaded bore 21 into which the pressure gauge 13 may be engaged. The details of the pressure gauge are immaterial and therefore will not be given in this specification.

The cock valve 16 is a three way valve. It controls a vent passage 22 through the side of the bushing 12 into the atmosphere. It also controls a passage 23 from the tubular member 10 through the bushing to the pressure gauge 13. The cock 16 when in the position as shown in Fig. 2 has the tubular member 10 and the gauge 13 connected with atmosphere. It may be rotated through 90° or 180° to control the pressure as desired. The purpose for having the two valves 14 and 15 with the chamber 10ª interposed therebetween is to prevent fluctuations of the engine from directly acting upon the gauge 13 to cause rapid changes in the gauge preventing it from being read properly. With each explosion of the engine a fast sharp moving pressure is set up which would cause sharp changes in the pressure gauge. When this sharp moving pressure passes the valve 14 and enters the chamber 10ª it has ample space within which to lose its jerky motion and smooth out before passing the valve 15 to enter the gauge 13 at an even pace to permit the gauge to accurately measure its velocity.

The operation of the device is as follows:

A spark plug of an internal combustion engine or similar engine is removed and in its stead the pressure gauge is mounted. The threaded end 11ª is screwed into the threaded opening which previously held the spark plug. The engine is then operated on its other cylinders. The pressure built up within the cylinder will be forced into the compartment 10ª. The valve 14 lifts to permit the pressure to enter, but prevents exit. As the pressure is being built up in the compartment 10ª the valve 15 will lift and permit the pressure to reach the gauge 13. In order to do this it is necessary that the cock 16 be in a position turned 180° from the position shown in Fig. 2. The gauge 13 will show the maximum pressure produced in the cylinder of the engine. The cock 16 may then be turned to release the pressure within the compartment 10ª and the gauge which then discharges into the atmosphere.

In Fig. 5 a modification of the invention has been disclosed in which an arrangement is provided to hold the valves inoperative so that the fluctuating pressure within the cylinder may be examined. The arrangement consists in each of the valves 14 and 15 being provided with a depressible plunger 24 arranged to hold the valves against the side wall of the tubular bushing, and so, inoperative. The plunger 24 is normally urged into an inoperative position by a spring 25 which acts against a flange 26 formed on the plunger 24 and a plug 27 mounted upon the bushing. A packing gland 28 is also associated with the plunger 24 to prevent leakage of pressure. The plungers 24 normally extend to the exterior so that they may be depressed.

The operation of the modified form of the invention is identical to the preferred form except for the fact that one or both of the plungers 24 may be manually depressed for incapacitating one or both of the valves—the valves 14 and 15. The gauge will now show the fluctuating pressure which may be examined with necessary instruments, or the naked eye.

Another test for the internal combustion motor would be to remove all of the spark plugs at one time and to substitute pressure gauges as described in this invention for each of the spark plugs. It is then necessary that the motor be manually turned over or mechanically turned over for ascertaining its condition.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A pressure gauge for internal combustion engines or the like, comprising a tubular member forming a compartment, a tubular bushing attached on the lower end of said compartment and threaded for engaging into the spark plug opening of one of the cylinders of said engine, a tubular bushing attached on the upper end of said tubular member and adapted to support a pressure gauge, a one way valve in the bottom bushing for controlling the entrance of pressure into said compartment, a one way valve in said top bushing for controlling the entrance of pressure from said compartment to said pressure gauge and so prevent the transmission of possible fluctuations, and pressure in said compartment, and a three way cock valve for controlling said pressures to connect with said gauge or with atmosphere, each tubular bushing having a reduced portion over which the ends of the tubular member engage, and a pin engaged through these ends for holding the parts together, said pin serving as a stop for said valves.

2. A pressure gauge for internal combustion engines or the like, comprising a tubular member forming a compartment, a tubular bushing attached on the lower end of said compartment and threaded for engaging into the spark plug opening of one of the cylinders of said engine, a tubular bushing attached on the upper end of said tubular member and adapted to support a pressure gauge, a one way valve in the bottom bushing for controlling the entrance of pressure into said compartment, a one way valve in said top bushing for controlling the entrance of pressure from said compartment to said pressure gauge and so prevent the transmission of possible fluctuations, and pressure in said compartment, and a three way cock valve for controlling said pressures to connect with said gauge or with atmosphere, each tubular bushing having a reduced portion over which the ends of the tubular member engage, a pin engaged through these ends for holding the parts together, and a plate on said pin against which said valve abuts for acting as a stop for said valve.

JOHN BONHARD.